United States Patent [19]

Terrel

[11] Patent Number: 5,690,000
[45] Date of Patent: Nov. 25, 1997

[54] BRAKE PEDAL WITH SELF-ALIGNING BRACKET

[75] Inventor: Robert Wayne Terrel, Tipp City, Ohio

[73] Assignee: General Motors Corporation, Detroit, Mich.

[21] Appl. No.: 614,754

[22] Filed: Mar. 13, 1996

[51] Int. Cl.[6] ..................................................... G05G 1/16
[52] U.S. Cl. ................................................. 74/560; 74/563
[58] Field of Search .......................... 74/560, 562, 562.5, 74/563; 403/282

[56] References Cited

U.S. PATENT DOCUMENTS

| | | | |
|---|---|---|---|
| 376,566 | 1/1888 | Wardwell. | |
| 924,398 | 6/1909 | Stevens | 403/282 X |
| 2,077,279 | 4/1937 | Snell | 74/560 |
| 2,133,393 | 10/1938 | Miller | 74/563 |
| 4,176,562 | 12/1979 | Allert et al. | 74/563 |
| 4,345,487 | 8/1982 | Straker | 74/563 |
| 4,404,439 | 9/1983 | Leighton | 200/61.89 |
| 5,398,569 | 3/1995 | Carr | 74/560 |

FOREIGN PATENT DOCUMENTS 230223  11/1985  Japan ..................................... 74/563

*Primary Examiner*—Charles A. Marmor
*Assistant Examiner*—Mary Ann Battista
*Attorney, Agent, or Firm*—Jeffrey A. Sedlar

[57] ABSTRACT

A brake pedal assembly includes a pedal arm formed from one-piece of aluminum bar stock which is pivotally mounted by a bushing holder fixed on the pedal arm by external upsetting. The pedal arm includes two integral projections which receive the foot pad plate that is secured on the pedal arm by staking of the integral projections. This enables the assembly of a brake pedal without welding of material and facilitates the use of aluminum material in fabricating the pedal arm.

3 Claims, 2 Drawing Sheets

5,690,000

BRAKE PEDAL WITH SELF-ALIGNING BRACKET

BACKGROUND OF THE INVENTION

The present invention relates to a brake pedal assembly for use in a vehicle and more particularly, to a brake pedal assembly that is constructed without using welding in the manufacturing process.

A typical brake pedal assembly includes a pivotal pedal arm adapted for rotation about its upper end. The brake pedal assembly includes a foot plate assembly that is connected to the pedal arm typically by welding. This type of brake pedal assembly also generally includes an output connector attached to the pedal arm between its upper pivotal end and the foot plate assembly. The output connector is provided for connection with a push-rod to transfer input forces from the brake pedal assembly to a master cylinder. The output connector is attached to the pedal arm by a means such as welding.

The use of welding processes in manufacturing a brake pedal assembly contributes to the overall costs of the conventional brake pedal assembly. Therefore, the preferable manner of manufacturing a brake pedal assembly would not require the use of welding processes.

SUMMARY OF THE INVENTION

The present invention provides a weldless brake pedal assembly which preferably includes structural components made of light weight material such as aluminum. The brake pedal assembly includes a pivotal pedal arm that is preferably formed from a one-piece aluminum bar. The pedal arm has two integral projections near its lower end for attachment to a plate. The plate is generally flat and includes two holes which are received over the integral projections of the pedal arm and the plate is secured to the pedal arm by deformation of the projections. The plate is preferably covered with a resilient pad.

The brake pedal arm includes an opening near its upper end for receiving a cylindrical bushing holder which is fixedly secured in the opening by a process resulting in an external enlargement of the bushing holder on each side of the pedal arm. A switch plate is preferably simultaneously assembled onto the brake pedal by positioning it on the bushing holder prior to the external enlargement thereof. The pedal arm also preferably includes an opening somewhat below the bushing holder that carries an output pin. The output pin is fixedly attached to the pedal arm by staking.

Assembling a brake pedal according to the present invention eliminates welding and therefore, reduces the overall cost of the assembly and simplifies manufacturing. In addition, the assembly does not have to be inspected for weld quality and the pedal arm may be more readily made of aluminum rather than steel.

A brake pedal assembly according to a preferred embodiment of the present invention includes a pedal arm fabricated from a one-piece aluminum bar The aluminum bar is formed with an upper section and a lower section, the upper and the lower sections connected by an offset section. A backing arm is formed as part of the lower section and bent to a position approximately 90 degrees relative to the lower section. A portion of the lower section including the backing arm is formed with a cut-out leaving a first projection and a second projection extending from the backing arm and formed as part of the backing arm.

The upper section of the pedal arm includes a first opening. A cylindrical bushing holder is received within the first opening and fixed therein by a first bead and a second bead. A bracket is fixed against the pedal arm by the bushing holder. The bracket is self-aligning in position by including a self-aligning arm that is positioned against the upper section of the pedal arm so that a face of the bracket is properly positioned. An output pin is fixedly retained on the upper section by being positioned in a second opening. The output pin includes a head that is deformed to securely maintain the output pin in position.

A plate is received onto the two projections of the backing arm and nests in the cutout. The projections are deformed by staking so that a bead is formed on each projection to maintain the plate in position securely on the pedal arm so that the backing arm provides a secure support across a substantial part of the plate. A resilient foot pad is positioned on the plate completing the assembly.

DETAILED DESCRIPTION OF THE PRESENTLY PREFERRED EMBODIMENT

Figure 1:
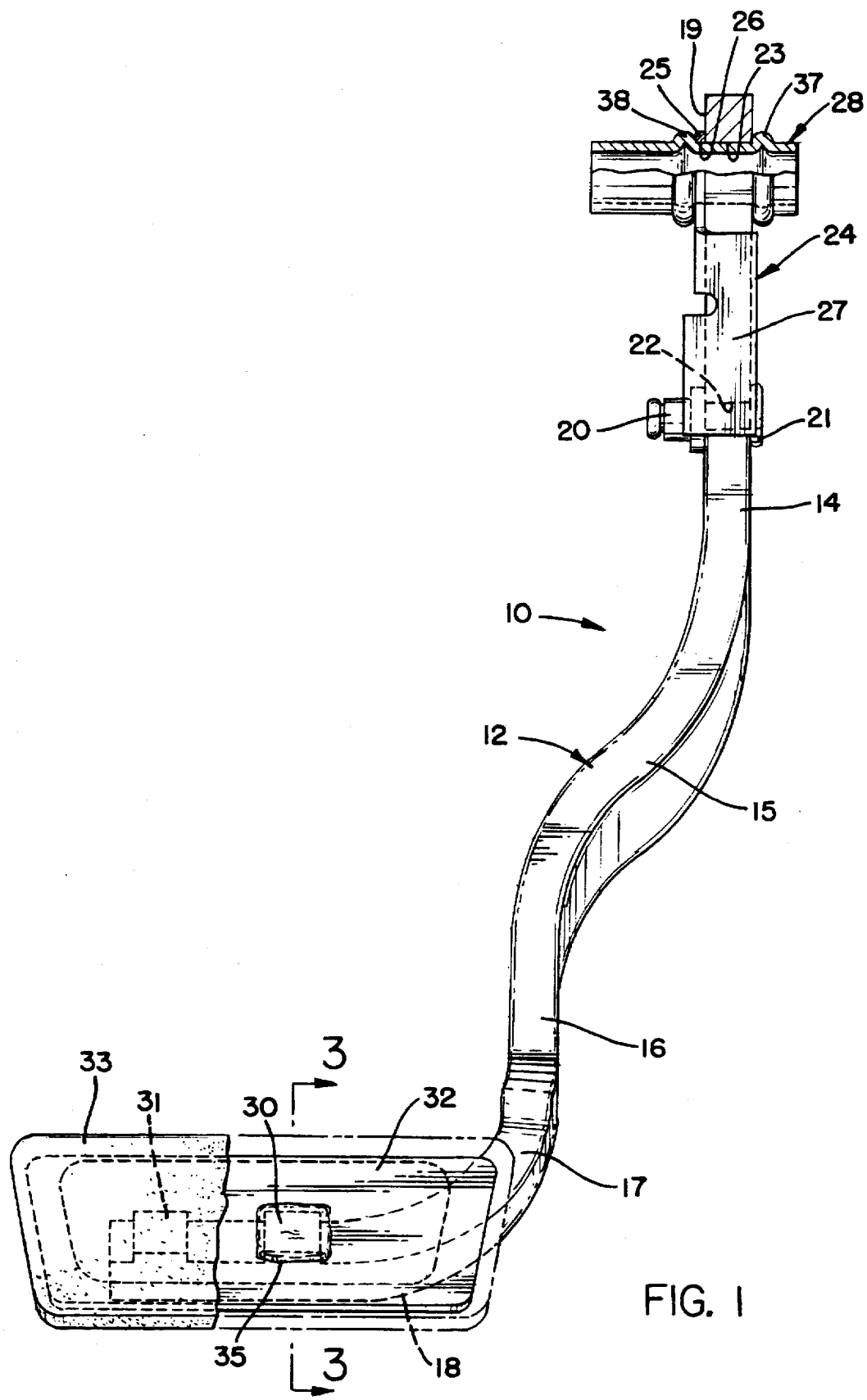
FIG. 1 is an illustration of a brake pedal assembly.
Figure 2:
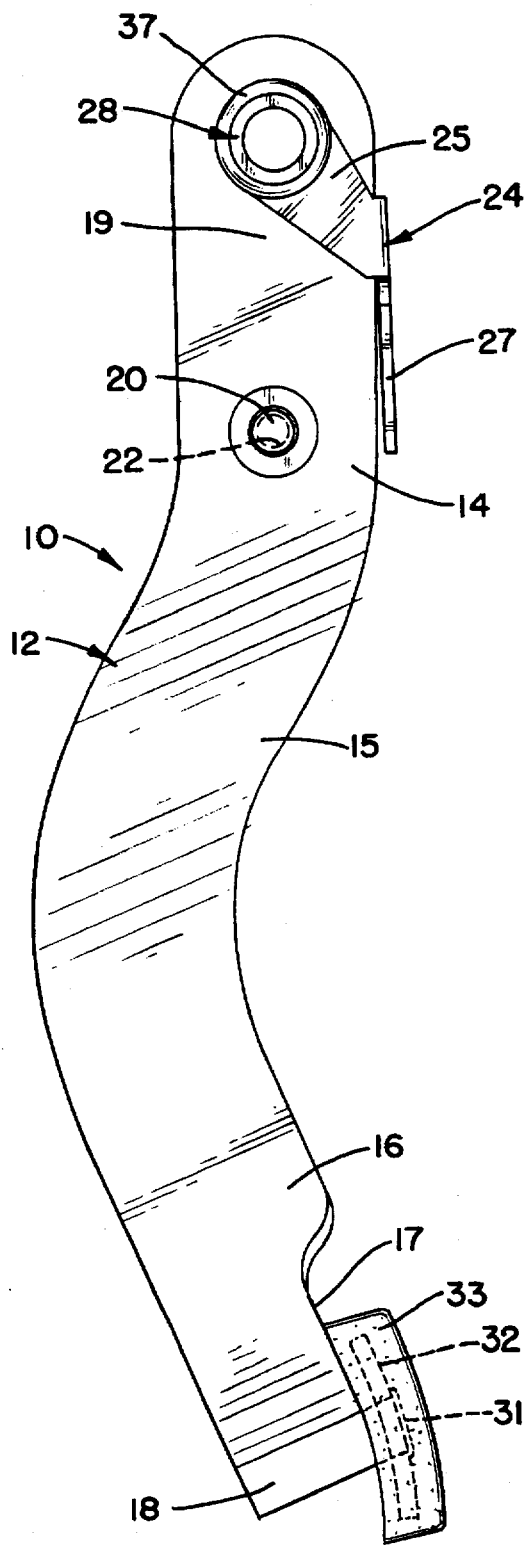
FIG. 2 is a side illustration of the brake pedal assembly of FIG. 1.

Referring to the drawings, illustrated in FIG. 1 is a brake pedal assembly designated in the aggregate as 10. The brake pedal assembly 10 includes a pedal arm 12 that is fabricated from a one-piece aluminum bar formed with an upper section 14 and lower section 16 connected by an offset section 15. The offset section 15 is shaped so that the lower section 16 is placed in the vehicle at a specifically selected location to the left and slightly forward of the upper section 14. The lower section 26 includes a backing arm 18 that is bent to a position approximately 90 degrees relative to the lower section 16. Additionally referring to FIG. 2, the pedal arm 12 includes a cut-out 17 which leaves two integral projections 30 and 31 extending from and formed as part of the backing arm 18 and forms the backing arm 18 slightly narrower than the remainder of the pedal arm 12.

The upper section 14 of pedal arm 12 includes an opening 23 which extends completely through the pedal arm 12. The opening 23 receives a cylindrical bushing holder 28. Bushing holder 28 receives a bushing (not illustrated), to facilitate rotation of the brake pedal assembly 10 about a shaft (not illustrated).

A self-aligning bracket 24 is carried on the upper section 14 by sliding the opening 26 of arm 25 over the bushing holder 28. The arm 25 provides the self aligning feature by being positioned against surface 19 of the upper section 14 so that the face 27 of bracket 24 is positioned over the front of the upper section 14. Location of the face 27 is critical because it may be used for operation of a switch to monitor actuation of the brake pedal assembly 10 for various braking related vehicle functions.

The bushing holder 28 and bracket 24 are fixedly secured on the pedal arm 12 by mechanical deformation of the bushing holder 28 on each side of the upper section 14 by a means such as external upsetting of the material of the bushing holder 28 at beads 37 and 38. An output pin 20 is also fixedly retained on the upper section 14 by being positioned in an opening 22 and by staking the head 21 to securely maintain the output pin 20 in position.

Figure 3:
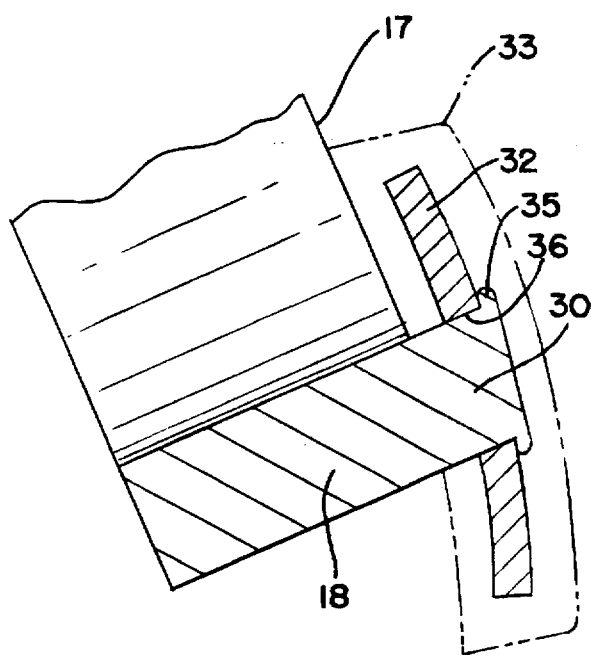
FIG. 3 is a fragmentary cross-sectional illustration taken generally through the plane indicated by the line 3—3 of FIG. 1.

Referring additionally to FIG. 3, attachment of plate 32 to the backing arm 18 is shown in greater detail. Plate 32 includes two openings representative of which is opening 36. The plate 32 is pressed onto the projections 30 and 31 of the backing arm 18 so that the plate 32 nests in the cutout 17. The projections 30 and 31 are subsequently staked so that a bead represented by bead 35 is formed on each projection to maintain the plate 32 in position securely on the pedal arm 12. The backing arm 18 provides a secure support across a substantial part of the plate 32 providing a firm base therefor. A synthetic rubber foot pad 33 is positioned on the plate 32 to complete the brake pedal assembly 12.

Through the present invention a brake pedal assembly 12 is provided which is securely assembled without welding. The present invention also facilitates use of a single piece of aluminum bar stock as the pedal arm 12. This enables a means of reducing the weight when compared to a conventional steel pedal arm assembly and the invention results in a simplified manufacturing process in assembling a brake pedal. For further weight reduction, the pedal arm 12 may be made from an extruded cross section material. The use of integral projections 30 and 31 which secure the plate 32 to the pedal arm 12 also facilitates cost reduction.

What is claimed is:

1. A brake pedal assembly comprising:

a pedal arm with two projections formed as one-piece with the pedal arm;

a plate capable of supporting a foot pad positioned over the projections and fixed thereon by staking of the projections;

a brushing holder fixed on the brake pedal assembly by two beads formed by an external enlargement of the busing holder; and a bracket fixed in position on the brake pedal assembly by the busing holder wherein the bracket includes an opening which is received over the busing holder and an arm which is positioned against the pedal arm, the arm self-aligning the bracket on the brake pedal assembly.

2. A brake pedal assembly according to claim 1 further comprising an output pin staked on the pedal arm.

3. A brake pedal assembly comprising:

a pedal arm fabricated from a one-piece aluminum bar formed with an upper section and a lower section, the upper and the lower sections connected by an offset section;

a backing arm formed as part of the lower section and bent to a position approximately 90 degrees relative to the lower section;

wherein a portion of the lower section including the backing arm is formed with a cut-out with a first projection and a second projection extending from the backing arm and formed as part of the backing arm;

wherein the upper section of the pedal arm includes a first opening;

a cylindrical bushing holder received within the first opening and fixed therein by a first bead and a second bead;

a bracket fixed against the pedal arm by the bushing holder, the bracket having a face, wherein the bracket is self-aligning in position by including a self-aligning arm that is positioned against the upper section of the pedal arm so that the face of the bracket is properly positioned;

an output pin fixedly retained on the upper section by being positioned in a second opening wherein the output pin includes a head that is deformed to securely maintain the output pin in position;

a plate received onto the first and second projections of the backing arm and nesting in the cutout wherein the projections are deformed so that a bead is formed on each of the projections to maintain the plate in position securely on the pedal arm wherein the backing arm provides a secure support across a substantial part of the plate; and a resilient foot pad positioned on the plate.

* * * * *